United States Patent [19]

Greenwalt

[11] 4,416,688

[45] Nov. 22, 1983

[54] DIRECT REDUCTION OF ORES AND CONCENTRATION OF METALLIC VALUES

[75] Inventor: Richard B. Greenwalt, Danville, Calif.

[73] Assignee: Raymond Kaiser Engineers, Inc., Oakland, Calif.

[21] Appl. No.: 343,554

[22] Filed: Jan. 28, 1982

Related U.S. Application Data

[63] Continuation of Ser. No. 183,571, Sep. 2, 1980, abandoned, which is a continuation-in-part of Ser. No. 55,290, Jul. 6, 1979, abandoned.

[51] Int. Cl.³ .............................................. C22B 1/11
[52] U.S. Cl. ........................................... 75/6; 75/36; 266/137
[58] Field of Search ................. 75/36, 33, 6; 266/137

[56] References Cited

U.S. PATENT DOCUMENTS

| | | | |
|---|---|---|---|
| 2,944,884 | 7/1960 | Halvorson | 75/33 |
| 2,986,460 | 5/1961 | Babcock et al. | 75/33 |
| 4,244,732 | 1/1981 | Brauns | 75/6 |

Primary Examiner—M. J. Andrews
Attorney, Agent, or Firm—Burns, Doane, Swecker & Mathis

[57] ABSTRACT

The process for beneficiating iron ore, particularly high phosphorous iron ore, by controlled selective solid-state reduction in which the resultant sponge iron is produced in a malleable condition followed by ultrafine preferential grinding to form flake powder of the sponge iron and produce finely divided oxide gangue, including the phosphate bearing materials, and separation of said flake powder and finely divided gangue by conventional concentration techniques to obtain a high iron flake powder concentrate.

6 Claims, 1 Drawing Figure

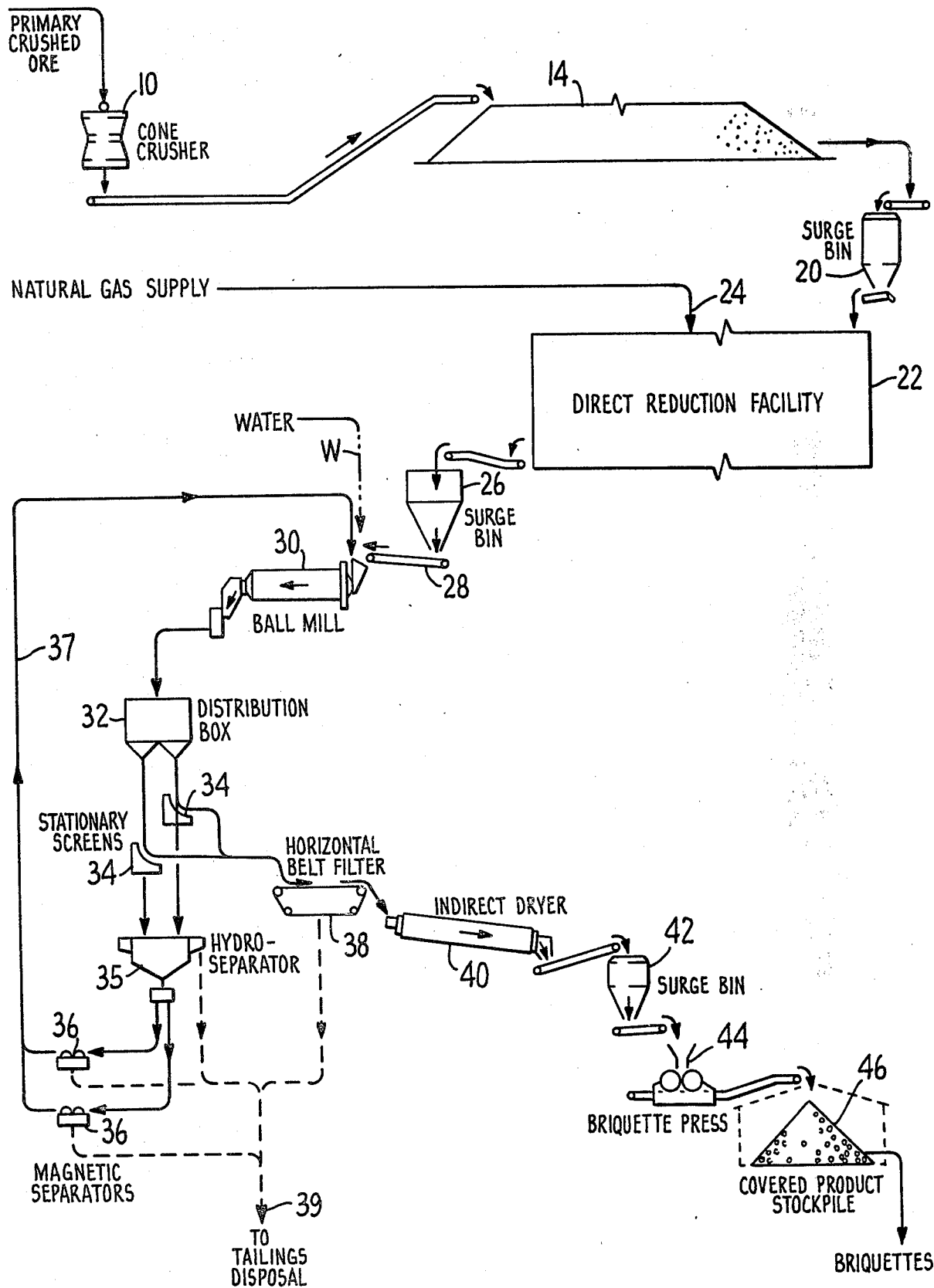

DIRECT REDUCTION OF ORES AND CONCENTRATION OF METALLIC VALUES

This is a continuation, of application Ser. No. 183,571, filed Sept. 2, 1980 now abandoned, which in turn is a continuation-in-part of application of Ser. No. 55,290, filed July 6, 1979 entitled Direct Reduction of Ores and Concentration of Metallic Values now abandoned.

BACKGROUND OF THE INVENTION

1. Field of the Invention

This invention relates to the recovery of iron of relatively high metallic content by direct reduction of iron ores, concentrating the resulting sponge iron by grinding and separating it from the gangue and other waste material. The reduction operations is carried out at relatively high temperatures and under conditions both during and after reduction whereby carbon presence in the sponge iron is minimized. The sponge iron is recovered as iron flake powder after grinding and separation. Conventional apparatus may be used in the process. The process is particularly useful for high phosphorous iron ores.

2. Description of the Prior Art

Many processes have been proposed for the direct reduction of iron ores to produce metallic iron or the like. These processes are carried out at various temperatures ranging from below 900° C. up to and over 1200° C. and using various types of reducing agents. Generaly speaking, to effect complete reduction in a reasonable time the reduction must be carried out between 950° C. and 1000° C. the product may begin to sinter and at 1200° C. a pasty porous mass may form. At 1300° C. the mass absorbs carbon rapidly and begins to fuse. The upper melting point of the iron, that is the point at which it becomes liquid, is 1530° C. Also at high temperatures, the ore will be reduced and carbon is absorbed from the fuel. Sulfur is also readily absorbed by the metal and is difficult to remove.

The processes which have been used for direct reduction have included well known types of apparatus, such as shaft furnaces, rotary and stationary kilns, retort furnaces, electric furnaces, fluidized bed reactors and many other types of furnaces. Reducing agents of all kinds have been used, such as coal, coke, graphite, char, distillation residues, fuel oil, tar, coal gas and hydrogen.

None of the foregoing processes, whether utilizing rotary kilns, shaft furnaces, fluidized beds, retorts or other equipment, suggest direct reduction of iron ores at temperatures from 900° C. to 1200° C. and thereafter handling the sponge iron so produced so as to minimize carbon at below 0.25% and preferably below about 0.10%, to recover metallic iron flake powder that is readily separated from gangue and other waste materials.

Typical among the prior art processes are those disclosed in U.S. Pat. No. 2,994,884 to Halvorson and U.S. Pat. No. 2,986,460 to Babcock et al.

Halvorson is to a method of producing high iron concentrates from iron ore by reducing and grinding wherein the iron ore is first crushed to $-\frac{3}{8}$ inch and finer and then mixed with carbon of a reactive form in an amount at least 50% more than theoretically needed for complete reduction of the iron ore to metallic iron. Although the furnace charge is heated to about 870° C., and preferably to between about 1030° C. and to about 1100° C., such heating is for a prolonged period of time (about 18 to 21 hours). Also, it is carried out under conditions in which the iron is not only fully reduced, but it also carburized to produce iron carbide particles that lose malleability on fast cooling. Thereafter the charge is ground and the carburized iron particles contain at least about 0.65% carbon, an amount far in excess of that specified herein.

The Babcock et al patent is to a process of producing a sponge iron by direct reduction in a rotary kiln from iron ore having substantial gangue content wherein the ore is intermixed with a carbon reducing material and the reduction is effected at temperatures about 900° C. The essence of the invention lies in the controlled cooling of such product under non-oxidizing conditions to obtain a sponge iron that is capable of being readily briquetted so as to serve as a feed for open hearth furnaces. However, minimizing of carbon is not important and the combined carbon may rise above 0.2% and often reaches values of 0.6% to 0.8% depending upon the metallization of the iron.

SUMMARY OF THE INVENTION

By the present invention ground iron ore, which may be fed to a direct reduction furnace in pellet or agglomerated form of the like, or as finely divided material, dependent on the direct reduction system employed, is first subjected to a relatively high reduction temperature and under conditions both during reduction and in handling thereafter whereby carbon formation is minimized and reactive carbon is kept to a low point. The reduction temperatures employed are at least 900° C., and are preferably 1000° C. to 1200° C. During the reduction step the Fe content of the iron ore product treated is raised substantially, that is from on the order of 55 to 57% Fe, up to on the order of 79% Fe.

It has been found that sponge iron prepared at such relatively high reduction temperatures and having a carbon content of not to exceed about 0.25, and preferably below about 0.10% C content, has an unexpectedly high degree of malleability so that it is readily ground in a ball mill or the like to malleable iron flake powder while gangue of oxides of silicon, phosphorous and other waste materials are finely ground and readily separated from the iron flake powder by screening, magnetic separation and other conventional separation means. Such grinding may be by either wet or dry means. The concentration steps whereby the malleable iron constituent of the reduced sponge iron is formed into iron flake powder and the gangue and other waste material is finely ground so that it can be readily separated from the iron flake powder is referred to herein as ultrafine preferential grinding.

The recovered iron flake powder is dried, if required, and may be used directly by remelting and refining in electric furnaces or the like, or may be agglomerated for storage, shipment or further use, or even be fabricated directly into ferrous articles, depending on the ultimate desired use for the sponge iron recovered from this invention.

Various grades of iron ore may be processed by the present invention, including high phosphorous iron ores, because the ultrafine preferential grinding following high temperature reduction unexpectedly removes substantial amounts of phosphorous oxides with the other undesirable oxide impurities present in the low carbon sponge iron. The iron oxides in the solid state reduce easily to metal in preference to other oxides.

Among the advantages of the invention is that high grade metallic iron can be recovered from relatively undesirable ores at reduced capital expense and with minimum energy consumption. The invention can be more completely understood after reference to the drawing and the detailed description which appear hereinafter.

BRIEF DESCRIPTION OF DRAWING

The invention will be further understood by reference to the accompanying drawing, wherein FIG. 1 is a schematic flow diagram illustrating the principle process steps of the present invention, including ore grinding and preparation facilities.

DETAILED DESCRIPTION OF THE INVENTION

Referring to the drawing, the essential steps of the process are shown in conjunction with the ore preparation system used in connection with the process. In the process as shown in the attached drawing the ore which is used is an iron ore characterized by relatively high phosphorous. The ore 14 is passed through a primary crusher (not shown) and then goes to a cone crusher 10 from where it is screened by conventional means (not shown). At this point the ore may be separated into a relatively coarse fraction and a relatively fine fraction, depending on whether the conditions of the direct reduction step to follow call for coarse ground ore, or for sized pellets formed from the fine fraction, or for fine particle size ore.

The coarse fraction is in a size range of from about $-30$ mm to $+6$ mm and the fine fraction is $-6$ mm. These materials are separately stored in a normal manner until ready for use further on in the system.

The stored ground ore of the particle size required, when ready for use in the system is fed to the surge bin 20. In the system proposed approximately 70% of the ore is in the $-30$ mm by $+6$ mm size range and 30% of the ore in the minus 6 mm size fraction. Depending on the direct reduction system utilized either the 30 by 6 mm or the minus 6 mm ore can be processed on a campaign basis.

Other direct reduction systems may require that all or part of the minus 6 mm fines be in pelletized form. Size fractions can range from 100% minus 30 by plus 6 mm to 100% minus 6 mm. However, in the latter case most direct reduction systems will require some form of agglomeration depending on the percentage of minus 74 micron material present. In the system being described, the ore fractions and/or pellets may be fed to surge bin 20 to facilitate a uniform feed rate to the direct reduction furnace facility.

As heretofore discussed, the direct reduction furnace to which the ore is fed may be of any of the well known designs that are offered commercially at the present time. In the system described furnace 22 is a rotary kiln. Natural gas supply G serves as the fuel for the furnace and is introduced at 24. The ore after treatment in the kiln and conversion to sponge iron is fed into surge bin 26.

In the present invention it is important to maintain a temperature in the reduction furnace that is sufficiently high to heat the ore to the point that it is malleable on grinding. Heating to at least about 1000° C. is a satisfactory mode of operation. Although favorable results have been obtained at reduction temperatures as low as about 900° C., it is preferable to increase the temperature to at least about 1050° C. but less than about 1200° C. It has been found that ores that have been heated to 1000° C. or higher have an Fe constituent which is more malleable and hence is more readily recovered in the process of this invention. The Fe which is recovered from this process is an agglomerated flake powder material that is ductile in nature and is of great stability and is not likely to reoxidize. The recrystallization obtained at the higher reduction temperatures result in a ferrite grain structure that readily lends itself to grinding and agglomeration as a flake powder.

If the carbon is excessive, there is a tendency to form cementite ($Fe_3C$), as the maximum solubility of carbon in ferrite is 0.04%. In a typical example of a standard continuous operation, ore entering the rotary reduction reactor or kiln 22 has a 57% Fe content. Thereafter, following passage through the kiln 22 and then on to the surge bin, that is, after reduction and storage, it has an increased Fe content of on the order of 79% Fe.

The foregoing percentages of Fe may vary depending on particular types of ores. However, the variation is minimal and the approximate 20% or more increase in Fe content during reduction is typical due to elimination of oxygen from the iron oxides.

In order to minimize residual carbon content in the sponge iron, it is important that the direct reduced iron is cooled under controlled conditions to avoid carbon deposition and formation of cementite as the material is cooled through the temperature at which Boudouard reaction will occur, that is at temperatures of 800° C. or less in the presence of carbon dioxide and carbon monoxide. Carbon in excess of 0.10% reduces the malleability of the sponge iron and its ability to agglomerate as flake powder. Accordingly, it is desirable to keep the carbon content below 0.10%, although it is possible to operate with a higher carbon content provided that C does not exceed 0.25%.

In any event it is to be understood that the above described direct reduction step, whether using a rotary furnace or other apparatus for heating the ore, is to be carried out at high temperature with low carbon deposition. This is an essential step in the process in order to produce a sponge iron having the desired characteristics, particularly with respect to malleability and low carbon.

Sponge iron leaving the direct reduction furnace must be handled in such a way that carbon does not increase to objectionable amounts. This is accomplished by cooling the sponge iron under controlled conditions in a non-oxidizing gaseous atmosphere, that is by cooling with an inert gas or with a minimum of CO present.

In the system shown in the drawing the low carbon sponge iron in the form of a matrix of metallic iron and oxide gangue in lump or pelleted form is fed on belt 28 to ball mill 30. At that point water may be introduced from a treated recirculated supply W to mill 30 to aid the grinding.

The grinding operation conducted in mill 30 is a critical step in the proess, because it is at this stage that the advantageous phenomenon, resulting from the malleability of the sponge iron, is manifested. During grinding in the ball mill a hammering action occurs and the metallic iron grains are formed into aggregates and are discharged from the ball mill in the form of malleable flake powder. The malleable flake powder is generally in the range of 10 to 100 microns in size. The residual oxide gangue is ground to a fineness of less than 25 microns and generally finer than 10 microns in size and is readily separated from the matrix. The proportion of sponge iron grains coarser than 25 microns is significantly increased by the malleability of the ferrite grains and the relatively low carbon content thereof.

As the grinding and hammering action continues the particles of iron flake powder increase in size and the friable oxide gangue constituents, such as silica and alumina, are ground preferentially to an ultrafine size of less than 25 microns and generally finer than 10 microns, thus resulting in further liberation and reduction of oxide fractions from the matrix. The size differential that is generated between the larger flake metallic particles and the finely ground oxide gangue particles readily permit such separation.

The ground ore discharge from ball mill 30 has an iron content on the order of 83% to 84%, including the recirculating load that reenters the grinding system through line 37. The combined metallic iron and oxide gangue of this ball mill product is passed into a slurry distributor, or distribution box 32, and is fed to one or more stationary screens 34 having appropriately sized openings of 100 to 50 microns in size in the screening element. This is in the nature of a wet screening operation so that the coarse, malleable, aggregated iron flake powder passes over the screen as a sponge iron concentrate, while the ultrafine oxide gangue with the fine iron middling particles, pass through the screen for further treatment in hydroseparator 35 and low intensity magnetic separators 36, wherein the metallic values are recovered and returned through line 37. Fine oxide gangue is separated from the fine metallic iron fraction as it passes over the low intensity wet magnetic separator 26 and forms part of the nonmagnetic oxide gangue or tailings. The nonmagnetic tailings are sent to waste disposal 39 while the magnetic material is recycled and returned to the ball mill through line 37 for further grinding and hammering to upgrade the metallic iron and enhance further growth of the flake powder that thereafter passes over the screen as a high grade iron product of sponge iron concentrate.

The sponge iron flake powder recovered from the fixed screens 34 has an iron content of 93% to 95% in the system discussed herein and can be handled thereafter by any conventional means. In the embodiment disclosed this material is fed to a horizontal belt filter 38 or other filter medium for de-watering and is then passed to an indirect dryer 40, and conveyed to a surge bin 42 for feeding to a briquette press 44. It is then fed to stockpile 46 for ultimate use as steelmaking feed, as the case may be.

It is desirable that the flake powder be dried to remove residual moisture after filtering. Such drying should be carried out in a controlled atmosphere wherein oxidation of sponge iron concentrate by contact with air is avoided. Accordingly, the indirect dryer 40 may be of any conventional design so long as it prevents the undesirable oxidation effect. It is desirable that the dried sponge iron be kept under nitrogen atmosphere and in sealed storage bins, from which it is fed to the briquetting operation.

The briquetting operation 44 may be of any conventional arrangement. One useful form has been a roll type briquetting press which forms dense pillow shaped briquettes. If necessary a binder can be added to the briquetting feed, however, most high grade metallic iron briquetting operations are conducted without binders, especially if a high grade malleable iron feed is available.

The finished sponge iron briquettes are handled in conventional conveying equipment and stored in a covered stockpile 46. The briquetted product is protected from rain and other moisture to avoid water contamination when it is used as charge feed to electric arc steel making furnaces or to basic oxygen smelters. The sponge iron briquettes meanwhile can be stored indefinitely until shapped or otherwise utilized.

As disclosed herewith the invention has been concerned with the Gara Djebilet ores discussed at the outset. However, other ores which are useful in the invention are: Minette (France), Northants (England), Coto Wagner (Spain), Wadi Aswawin (Saudi Arabia), Alabama (U.S.A.), Fundidora (Mexico), and San Isidro (Venezuela).

It will be apparent from the preceeding discussion of the invention that the essence of this invention is the development of a mechanism of ultrafine preferential grinding and solid separation, that is, solid-state reduction without fusion or melting of sponge iron recovered from direct reduction at high temperatures (1000° C. or higher) while preferably maintaining a carbon content of less than 0.10%, followed by preferential grinding to effect a separation of the ductile ferrite grains which are transformed to relatively large flake powder particles which can be recovered by screening and magnetic separation procedures from finely divided oxide gangue material which is discharged as tailings. The ferromagnetic nature of the sponge iron leads itself to convenient low intensity magnetic separation procedures and is ideally suited to the metallic/oxide system separation. The foregoing is effected with minimum exposure of flake powder to oxidation.

It is to be understood that any standard type of equipment, as well as known processes, can be used in the direct reduction phase of the process, that is, shaft furnaces, rotary kilns, entrainment and fluidized systems as referred to above in the prior art discussion. The exception to the foregoing is that such equipment and processing must be used, or capable of use, in a manner to keep the carbon content of the sponge iron within the limits specified herein.

EXAMPLES

Ultrafine preferential grinding and concentration was evaluated on a high phosphorous mixed hematite-magnetite lump iron ore—Gara Djebilet ore from North Africa. This ore contained 57%, Fe. 13% $SiO_2$ plus $Al_2O_3$ and 0.5 (1.1 $P_2O_5$). Due to the oolitic fine grained nature of the ore, its previous response to conventional concentrating procedures had been poor with high iron losses and minor increases in grade. Accordingly, work was conducted by direct reduction of the ore at 1050° C. and the ore cooled under controlled conditions followed by ultrafine preferential grinding (UPG) as above described to produce metallic flake powder and fine oxide gangue followed by concentration to obtain a high grade low phosphorous product. The chemical analysis of the ore after direct reduction to 91% metallization and prior to concentration was 79% Fe, 13% $SiO_2$ plus $Al_2O_3$, and 0.7% P (1.7% $P_2O_5$) with 0.19% C.

For comparative purposes two commercially direct reduced products not processed according to the invention and instead at a low reduction temperature and cooled so as to have a high residual C level—Fire Lake pellets and Fire Lake briquettes —were tested to determine their response to ultrafine preferential grinding (UPG) for preparation of a high grade concentrate. The direct reduced products were originally prepared from hematite concentrates containing 65% Fe and 3.5% $SiO_2$. The chemical analyses of the direct reduced pellets and briquettes before ultrafine preferential grinding and concentration were as follows:

|  | % Met | % Fe | % $SiO_2$ | % C |
|---|---|---|---|---|
| Pellets | 93 | 91.6 | 5.5 | 1.0 |
| Briquettes | 91 | 89.5 | 5.5 | 1.5 |

The briquettes are lower metallized, high carbon fines resulting from degradation of the pellets during the direct reduction process.

Results of UPG and Concentration

Gara Djebilet high phosphorous iron ore identified above was treated by ultrafine preferential grinding after direct reduction and subsequently concentrated by fine screening and low intensity magnetic separation. The metallurgical results with the 91% metallized ore containing 0.19% carbon are given as follows:

|  | % Fe | % Wt | % FeRec | % S + A* | Conc Eff %** |
|---|---|---|---|---|---|
| Head | 79.6 | 100.0 | 100.0 | 13.0 | — |
| Conc | 92.7 | 82.2 | 95.8 | 3.0 | 67 |
| Tail | 18.8 | 17.8 | 4.2 | — | — |

*$SiO_2$ and $Al_2O_3$
**Concentration Efficiency % = $\frac{(FeRec - WtRec) \times 100}{100 - \% \text{ Fe in Feed}}$ Iron content was significantly increased from 79.6 to 92.7% at a 95.8% iron recovery. Oxide gangue was markedly reduced from 13% to 3% in the sponge iron flake powder concentrate. A high concentration efficiency of 67% was obtained when iron flake powder was produced during grinding.

A complete metallurgical balance for Fe and $P_2O_5$ after ultrafine preferential grinding and concentration of Gara Djebilet high phosphorous iron ore is given in the following table.

| GARA DJEBILET IRON ORE METALLURGICAL BALANCE-DR CONCENTRATE | | | | | |
|---|---|---|---|---|---|
|  | % Wt | % Fe | Fe % Dist | % $P_2O_5$ | $P_2O_5$ % Dist |
| Direct Reduced Feed | 100.0 | 79.3 | 100.0 | 1.69 | 100.0 |
| +25 Microns | 48.6 | 92.5 | 56.7 | 0.74 | 21.2 |
| −25 Micron Magnetic Concentrate | 31.1 | 92.7 | 38.7 | 1.27 | 24.9 |
|  | 81.7 | 92.6 | 95.4 | 0.96 | 46.1 |
| Tailings −25 Microns | 18.3 | 19.9 | 4.6 | 4.97 | 53.9 |
| Total −25 Microns | 51.4 | 66.8 | 43.3 | 2.59 | 78.8 |

The iron content of the concentrate was increased from 79.3 to 92.6% while the phosphorous content was decreased 43.2% from 1.69 to 0.96% $P_2O_5$ (0.42% Phosphorous). It is noted that after a single grinding stage, 56.7% of the iron is in the +25 micron size fraction as flake powder which has been increased in size exceeding 25 microns by the hammering action of the mechanical grinding and conveniently separated by screening. The maximum grain size of the original unreduced iron oxide grains was 10 microns.

After ultrafine preferential grinding (UPG) and concentration by fine screening and low intensity magnetic separation, the concentrate obtained under similar grinding procedures from the 1% carbon Fire Lake direct reduced pellets was as follows:

|  | % Fe | % Wt | % FeRec | % $SiO_2$ | Conc Eff % |
|---|---|---|---|---|---|
| Head | 91.6 | 100.0 | 100.0 | 5.5 | — |
| Conc | 95.0 | 89.2 | 92.5 | 2.6 | 39.0 |
| Tail | 63.5 | 10.8 | 7.5 | — | — |

Similarly, briquettes of 1.5% carbon Fire Lake low temperature reduced pellet fines were treated by UPG and concentration to obtain a concentrate. The results of the UPG-concentration are given as follows:

|  | % Fe | % Wt | % FeRec | % $SiO_2$ | Conc Eff % |
|---|---|---|---|---|---|
| Head | 89.5 | 100.0 | 100.0 | 5.5 | — |
| Conc | 94.1 | 81.4 | 85.6 | 2.0 | 40 |
| Tail | 69.4 | 18.6 | 14.4 | — | — |

The UPG-concentration procedures produced high grade concentrates from Fire Lake pellets and briquetted fines. However, compared to the low carbon high temperature reduced Gara Djebilet ore iron recovery was decreased and iron grade in the tailings was significantly higher for the reduced Fire Lake pellets and briquetted fines. High losses of iron occurred in the tailings of the Fire Lake pellets and briquettes due to decreased ductility and lack of flake powder production with the high carbon content of the low temperature sponge iron. Separation characteristics were poor as evidenced by the concentration efficiencies—about 40%—when processing the low temperature reduced, high carbon sponge iron pellet and briquette products.

Significant Process Parameters

The following are examples which illustrate the importance of various operational process factors on sponge iron malleability and on the production of an ultrafine preferential grind of the oxide gangue constituents. The data were determined on the Gara Djebilet high phosphorous iron ore.

Reduction Temperature vs Grind

In general, the higher the direct reduction temperature the more malleable the metallic iron and the coarser the grind obtained due to iron flake powder production. This is shown by the degree of fineness produced with constant grinding conditions of time, sample size and system.

| Reduction Temp-C. | Fineness % − 44 Microns |
|---|---|
| 900 | 91.5 |
| 1000 | 86 |
| 1050 | 69 |

Above samples were wet ground in a grinding mill for five minutes. As the reduction temperature increased, the sponge iron malleability increases and more flake powder aggregation of the metallics occured. There was a significant decrease in the fineness of the grind as a result. In the same standard grinding test, Fire Lake pellets and briquettes reduced at 800° C. were ground to a fineness of 91.5% and 91.7% minus 44 microns respectively, illustrating the brittle behavior of the low temperature high carbon sponge iron.

Degree of Reduction vs Grind

As the degree of reduction was increased at 1050° C. reduction temperature, the aggregating properties of Fe were improved by the greater proportion of ferrite present as flake powder and the fineness of grind decreased.

| Degree of Reduction | Fineness % − 44 Microns |
|---|---|
| 79.1 | 96 |
| 91.1 | 69 |
| 95.6 | 57 |

Grinding conditions in the above test were constant with respect to sample size, time and temperature.

Significant Metallurgical Parameters

The improved metallurgical results obtained by utilization of ultrafine preferential grinding are illustrated in the following examples from the concentration testwork on the Gara Djebilet reduced ore.

Grinding Time

The following UPG tests were conducted on samples of the same sponge iron utilizing a uniform grinding system and procedure. After fine screening and low intensity magnetic separation, of the sponge iron, the concentrates were analyzed with the following results:

| Grind Time-Min | % Fe | % FeRec | % FeTails | Conc Eff % |
|---|---|---|---|---|
| 2 | 92.2 | 95.3 | 32.0 | 50 |
| 5 | 92.6 | 93.2 | 30.0 | 61 |
| 10 | 93.7 | 95.5 | 19.8 | 70 |

The increased grinding time tended to give improved concentration efficiency and a decrease of iron in the tails as the sponge iron flake powder was formed. When sample grinding time was reduced to 30 seconds the resulting sample grinding time was reduced to 30 seconds the resulting concentrate was as follows:

| Grind Time-Min | % Fe | % FeRec | % FeTails | Conc Eff % |
|---|---|---|---|---|
| ½ | 85.3 | 88.1 | 78.4 | 17 |

Poorer metallurgical results are obtained in terms of lower grade and iron recovery when grinding time is insufficient for the iron flake powder to form and for liberation of the oxide gangue.

Reduction Temperature

Increasing reduction temperature was beneficial in increasing metallization and in improving iron recovery as given below:

| Reduction Temperature C. | % Met | % Fe | % FeRec | Conc Eff % |
|---|---|---|---|---|
| 1000 | 79.1 | 88.9 | 89.6 | 41 |
| 1050 | 91.1 | 92.7 | 95.8 | 67 |

The data show the advantages of increased malleability and metallic iron content on improved separation characteristics as temperature is increased.

Degree of Reduction

As percentage metallization is increased the concentrate grade and iron recoveries are improved as follows:

| % Met | % Fe | % FeRec | Conc Eff % |
|---|---|---|---|
| 79.1 | 88.9 | 89.6 | 41 |
| 91.1 | 92.7 | 95.9 | 67 |
| 95.6 | 92.7 | 95.5 | 65 |

The increasing ferrite content of the sponge iron up to 91% metallization resulted in increased iron content and iron recovery in the concentrates.

Although the foregoing descriptions represent preferred and advantageous embodiments of the invention, it is to be understood that modifications may be made in the process and system by those skilled in the art without departing from the scope of the invention as herein defined.

What is claimed is:

1. The process for recovering high quality malleable sponge iron with reduced phosphorous content from iron ores having a high phosphorous content comprising the following steps:
   (a) subjecting a charge of crushed high phosphorous iron ore to direct reduction in a non-oxidizing atmosphere;
   (b) heating said ore in a non-oxidizing atmosphere to temperatures within the range of at least about 900° C. to about 1200° C. to obtain iron with a ferrite grain struture and to obtain a high degree of metallization to recover a sponge iron material of increased Fe content having a carbon content of less than 0.10% as chemically combined carbon;
   (c) cooling said sponge iron in a controlled non-oxidization atmosphere of an inert gas or containing a minimum of carbon monoxide through the temperature in which the Boudouard reaction occurs to prevent re-oxidation thereof, to prevent the formation of any excess chemically combined carbon therein, and to avoid the formation of cementite;
   (d) grinding said sponge iron in a ball mill to thereby convert the Fe content of said sponge iron to a flake powder of agglomerated sponge iron grains while grinding the oxides, gangue and other waste materials therein to a finely divided state; and
   (e) screening and separating said sponge iron to obtain a concentrate having an Fe content of at least about 90%.

2. The process of claim 1 wherein the direct reduction step is carried out at temperatures wherein said iron ore is heated to a temperature within the range of about 1000° C. to about 1200° C.

3. The process of claim 1 wherein said ultrafine preferential grinding of sponge iron increases the Fe content thereof in excess of 90% by weight and the phosphorous contained in said iron ore is reduced to at least about 0.4% by weight.

4. The process of claim 1 wherein sponge iron recovered from the direct reduction step is subjected to ultrafine preferential grinding by wet grinding in a ball mill to thereby form flake powder of the malleable iron grains that tend to agglomerate and form larger particles of flake powder than the finely ground oxides, gangue and other waste constituents of said sponge iron.

5. The process of claim 1 wherein sponge iron recovered from the direct reduction step is subjected to ultrafine preferential grinding in the dry state to thereby form flake powder of the malleable iron grains that tend to agglomerate and form larger particles of flake powder than the finely ground oxides, gangue and other waste constituents of said sponge iron.

6. The process of claim 1 wherein a stream of said sponge iron that has been subjected to ultrafine preferential grinding is separated from the oxides, gangue and other waste constituents of said sponge iron by magnetic means.

* * * * *